United States Patent [19]

Norris

[11] 3,789,377

[45] Jan. 29, 1974

[54] PSEUDO-RANDOM SEQUENCE SYNCHRONIZATION FOR MAGNETIC RECORDING SYSTEM

[75] Inventor: Kermit A. Norris, Duarte, Calif.

[73] Assignee: Lockheed Electronics Company, Inc., Burbank, Calif.

[22] Filed: May 26, 1972

[21] Appl. No.: 257,374

[52] U.S. Cl. .................. 340/174.1 G, 340/174.1 H
[51] Int. Cl. .............................................. G11b 5/02
[58] Field of Search ............... 340/174.1 G, 174.1 H

[56] References Cited

UNITED STATES PATENTS

| | | | |
|---|---|---|---|
| 3,503,059 | 3/1970 | Ambrico | 340/174.1 B |
| 3,108,265 | 10/1963 | Moe | 346/74 |
| 3,622,894 | 11/1971 | Heideeker | 340/174.1 B |
| 3,496,557 | 2/1970 | Lowrance | 340/174.1 B |

*Primary Examiner*—Vincent P. Canney
*Attorney, Agent, or Firm*—Jackson & Jones

[57] ABSTRACT

A synchronization technique for multiple channel magnetic recording systems, is disclosed. The synchronization technique involves the phase modulation of data to be recorded on each of several parallel recording channels in accordance with a repeated pseudo-random sequence. Upon recovery of recorded signals in the respective channels, the phase modulation is detected to reconstruct the pseudo-random sequence which is then auto-correlated to produce a synchronization pulse once each cycle of the pseudo-random sequence. The synchronization pulses may be employed to overcome the effects of tape skew, jitter, or the like.

12 Claims, 7 Drawing Figures

PSEUDO-RANDOM SEQUENCE SYNCHRONIZATION FOR MAGNETIC RECORDING SYSTEM

BACKGROUND OF THE INVENTION

1. Field of the Invention

This invention generally relates to a synchronization technique and apparatus for use with magnetic recording systems. More specifically, the present invention concerns the use of pseudo-random sequences for providing cyclically occurring synchronization signals to permit alignment of conventional de-skew or de-jitter buffers, etc. or to indicate the beginning and/or end of records, or the like.

2. Description of the Prior Art

The recordation of digital data using systems having a plurality of parallel recording channels requires synchronization, that is, alignment of the conventional de-skew or de-jitter buffers of the system. This alignment is necessary to make possible and insure accurate recovery of the recorded data which would otherwise be prevented by the typically occuring tape skew, jitter, etc.

Typically, serially occurring data bits are converted to a parallel data bit format by a conventional converter for concurrent recordation on each of several recording channels of a recording tape or the like. The number of parallel bits in a format would correspond to the number of recording channels, i.e., the availability of three recording channels would involve serial data being converted to successive groups of three parallel bits for concurrent recordation on the respective channels.

Retrieval or recovery of the data recorded in each of the channels obviously must be done substantially concurrently. However, this requirement is frustrated by any physical misalignment, skew, or jitter of the tape with respect to the read heads of a recording system. For example, tape skew can result in data bits from two or more successively recorded parallel groups concurrently being read instead of the parallel bits of the same group, as recorded. Accurate recovery of parallel recorded data thus requires some means of correcting or compensating for any tape skew, etc.

Conventionally, some "synchronization" technique is used to properly temporally align or otherwise locate the data bits of each parallel group. Typically, prior art synchronization techniques may involve interruption or gapping of the recorded data stream to insert a special synchronization code word or words at regular intervals. As is well known, however, such interruption or gapping of the data stream presents cumbersome problems in the mechanization of a recording system since considerable logic is required for both the record and playback circuitry. The use of unique sync words further compounds mechanization complexity by requiring special playback detectors, etc.

It is accordingly the intention of the present invention to provide an accurate easily mechanized synchronization technique, and apparatus, that avoids the difficulties attendant to prior art synchronization techniques and which eliminates the need for gapping the data stream and/or inserting special synchronization code words.

SUMMARY OF THE INVENTION

Briefly described, the present invention involves a synchronization technique and apparatus that is useful for multiple recording systems.

More particularly, the subject synchronization system involves use of a pseudo-random sequence for phase modulating digital data to be recorded. Such phase modulation is concurrently accomplished for each of the multiple channels and involves advancing or delaying the occurrence of the bit cell boundary transitions in accordance with the bits of the pseudo-random sequence. Desired sync signals for each of the multiple channels is generated by detecting the occurrence of the bit cell boundary transitions with respect to the bit cell boundaries to effectively recover the pseudo-random sequence used to phase modulate the recorded data. The sequence is auto-correlated to provide a sync pulse once for each repeated pseudo-random sequence, the frequency of the sync pulses being in accordance with the length of the sequence used.

The objects and many attendant advantages of the invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

FIG. 7 is a graphic diagram illustrating a plurality of waveforms that are useful in describing the recording system of FIG. 1 in accordance with the present invention.

DESCRIPTION OF THE PREFERRED EMBODIMENT

Figure 1:
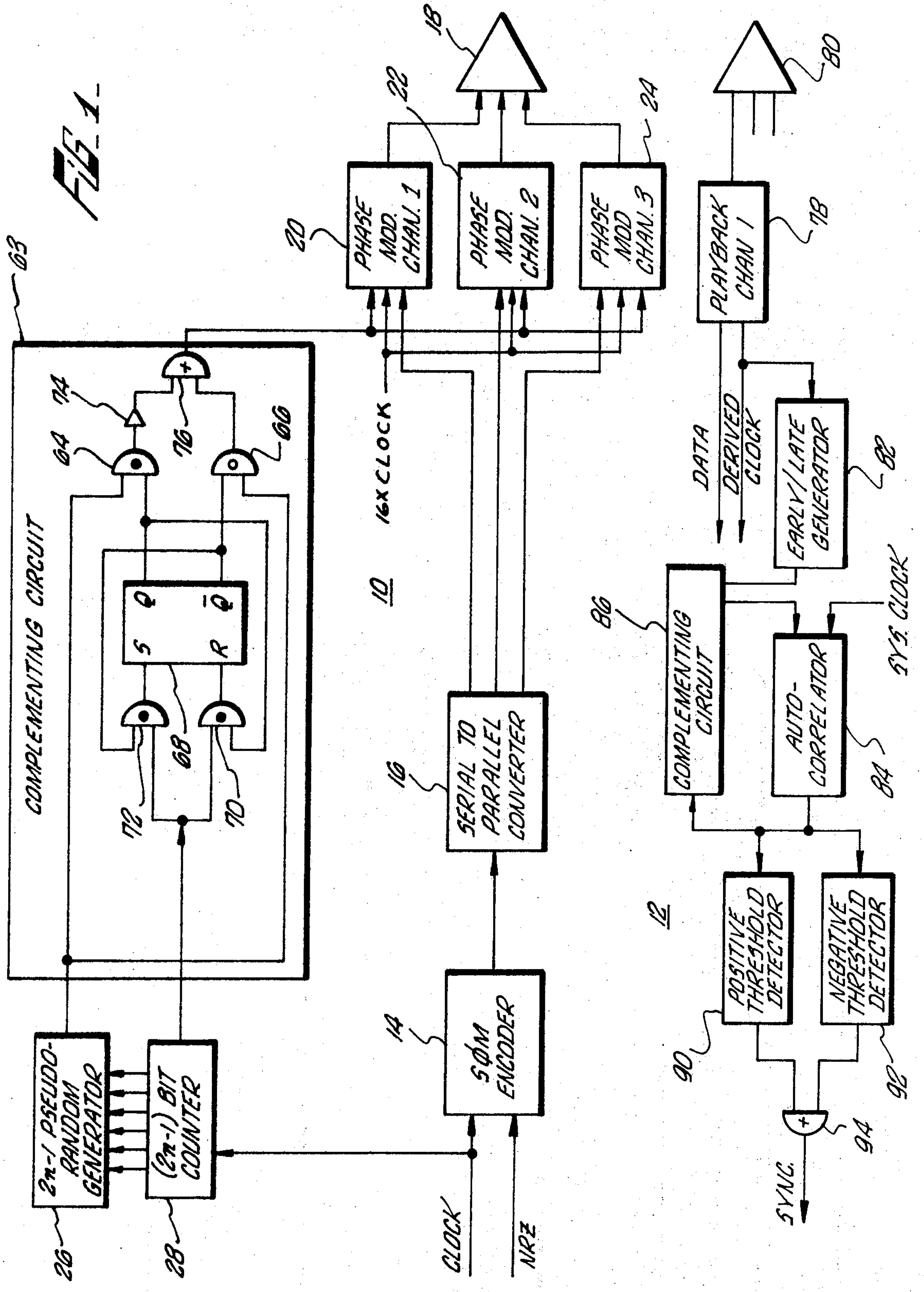
FIG. 1 is a schematic block diagram illustrating a pertinent portion of a multi-channel recording system including a synchronization system in accordance with the present invention.

Referring to FIG. 1 of the drawings, the pertinent portion of a multiple channel recording system adapted for pseudo-random sequence synchronization, in accordance with the present invention, is illustrated. As shown, the recording system includes a recording circuit 10 and a recovery circuit 12. Assuming that digital data to be recorded in a split phase mark (S0M) format, data in an NRZ format may be applied to a S0M encoder 14. Typically, the encoded data is then applied to a serial-to-parallel converter 16 for conversion from a serial format to a parallel format. The data would then be applied to a multiple-channel recording head 18, or the like, for recordation on the respective parallel channels of a tape recording medium or the like. The system of FIG. 1 is shown to include three parallel recording channels, however, it is to be understood that any other conventional number of channels may be used.

In accordance with the present invention, the several streams of parallel data bits are concurrently phase modulated by having the bit cell boundary transitions thereof modified, i.e., either advanced or delayed by a predetermined amount, in accordance with a repeated pseudo-random bit sequence. Phase modulators 20, 22 and 24 are accordingly provided for this purpose and are each connected to receive a stream of data bits to be recorded on one of the respective recording channels of the system. The phase modulators 20, 22 and 24 are also connected to be concurrently controlled according to a pseudo-random sequence provided by a pseudo-random sequence generator 26 which is cyclically advanced in a conventional manner, such as by a counter 28 where the generator 26 is a read only memory device. Any conventional shift register configuration may also be used to provide a pseudo-random sequence of bits of desired length.

Momentarily digressing, references to pseudo-random sequences in connection with the subject invention are intended to mean a sequence of binary bits wherein the successive occurrence of a binary "1" or "0" satisfies recognized basic "randomness properties" such as described in the text Digital Communications, Chapter 1, edited by Solomon W. Golomb, Prentice-Hall 1965. A detailed discussion of pseudo-random sequences may be found in "Sequences With Randomness Properties" by Solomon W. Golomb, Glen L. Martin Company, June 1965.

Briefly, the basic "randomness properties" include a "balance" property, a "run" property, and a "correlation" property. The "balance" property requires that in each period of the sequence the number of binary 1's differs from the number of binary 0's by at most one. The "run" property requires that among the successively occurring bits in a sequence, one-half the runs of each kind are of length one, a quarter of each kind of length two, an eighth of each kind are of length three, etc., as long as such fractions result in meaningful numbers of runs. The "correlation" property requires that if a period of the sequence is compared, term by term, with any cyclic shift of itself, the number of agreements differs from the number of disagreements by at most one. It is the "correlation" property that has been found to be of particular importance for providing synchronization for a recording system having multiple parallel recording channels. Finally, with respect to pseudo-random sequences, it is sufficient to note for the purpose of the subject invention that pseudo-random sequences may have a length including $2^n-1$ bits. Accordingly, pseudo-random sequences will always include an odd number of bits, i.e., 7, 15, 31, 63, etc.

Referring briefly to waveform G of FIG. 7, a seven bit pseudo-random sequence is illustrated to include the successive bits 0110100. The eighth bit illustrated in the waveform G indicates the beginning of a second cycle or period of the sequence as it is repeated. It is to be noted that the complement of the illustrated sequence would also constitute a pseudo-random sequence, i.e., the successive bits would be 1001011.

It is noted that a pseudo-random sequence of any length may be used to provide synchronization in accordance with the subject invention. However, it has been found that 63 bits is a particularly appropriate and useful sequence length. Nevertheless, for the purpose of simplicity of explanation, the subject invention is herein generally described by reference to a 7 bit pseudo-random sequence.

Figures 2, 3, 4, 5, 6:
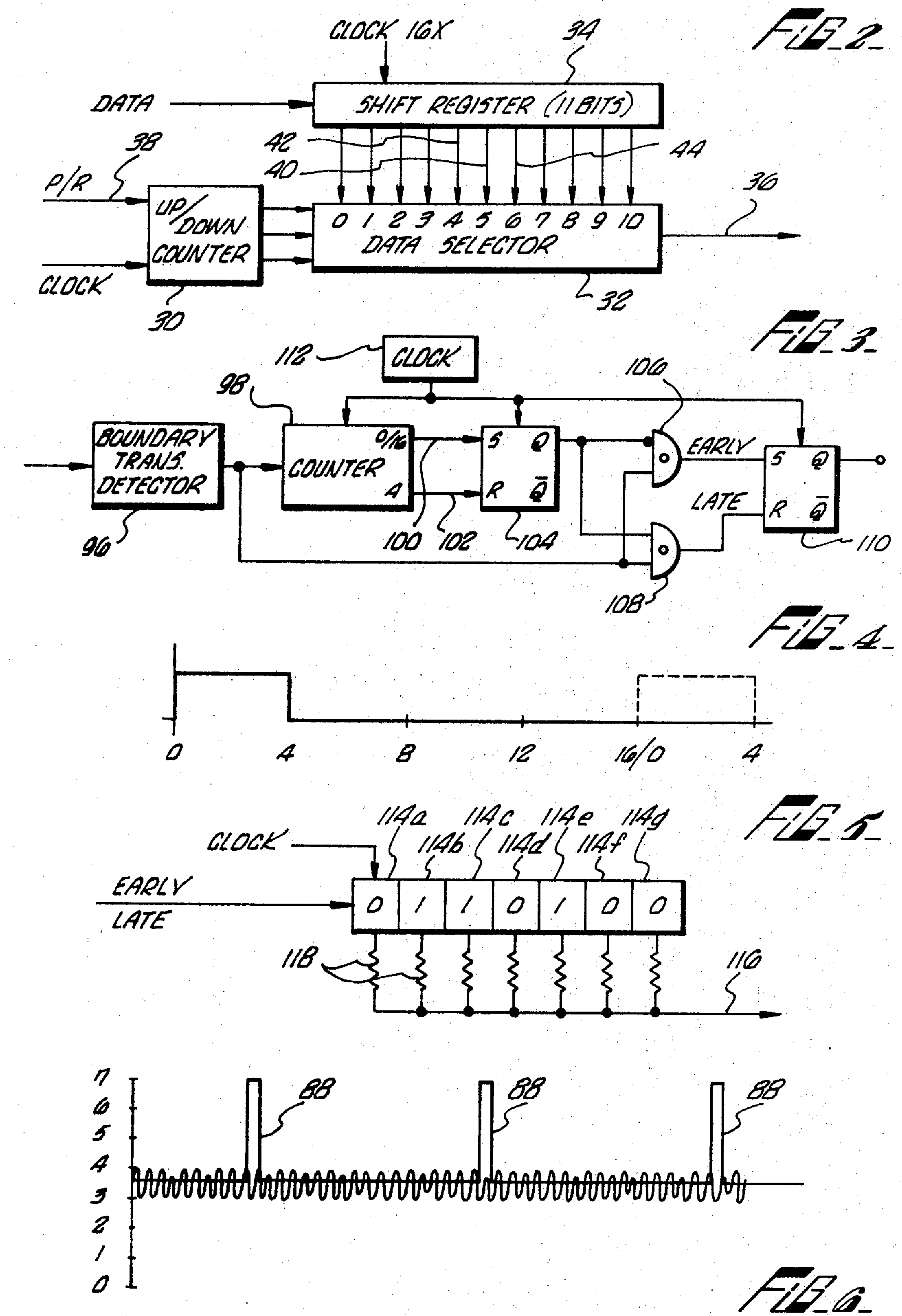
FIG. 2 is a schematic block diagram illustrating an exemplary phase modulator that may be employed with a recording system as shown in FIG. 1 in accordance with the present invention.
FIG. 3 is a schematic block diagram illustrating an exemplary early/late generator that is suitable for use with a recording system as shown in FIG. 1 in accordance with the present invention.
FIG. 4 is a graphic diagram illustrating the waveform of a signal that may be provided by an early/late generator as shown in FIG. 3.
FIG. 5 is a schematic block diagram illustrating a suitable auto-correlator circuit that may be used for a seven bit pseudo-random sequence in accordance with the present invention.
FIG. 6 is a graphic diagram illustrating the waveforms of output signals that would be provided as synchronization signals by the auto-correlator circuit shown in FIG. 5.
Figure 1:
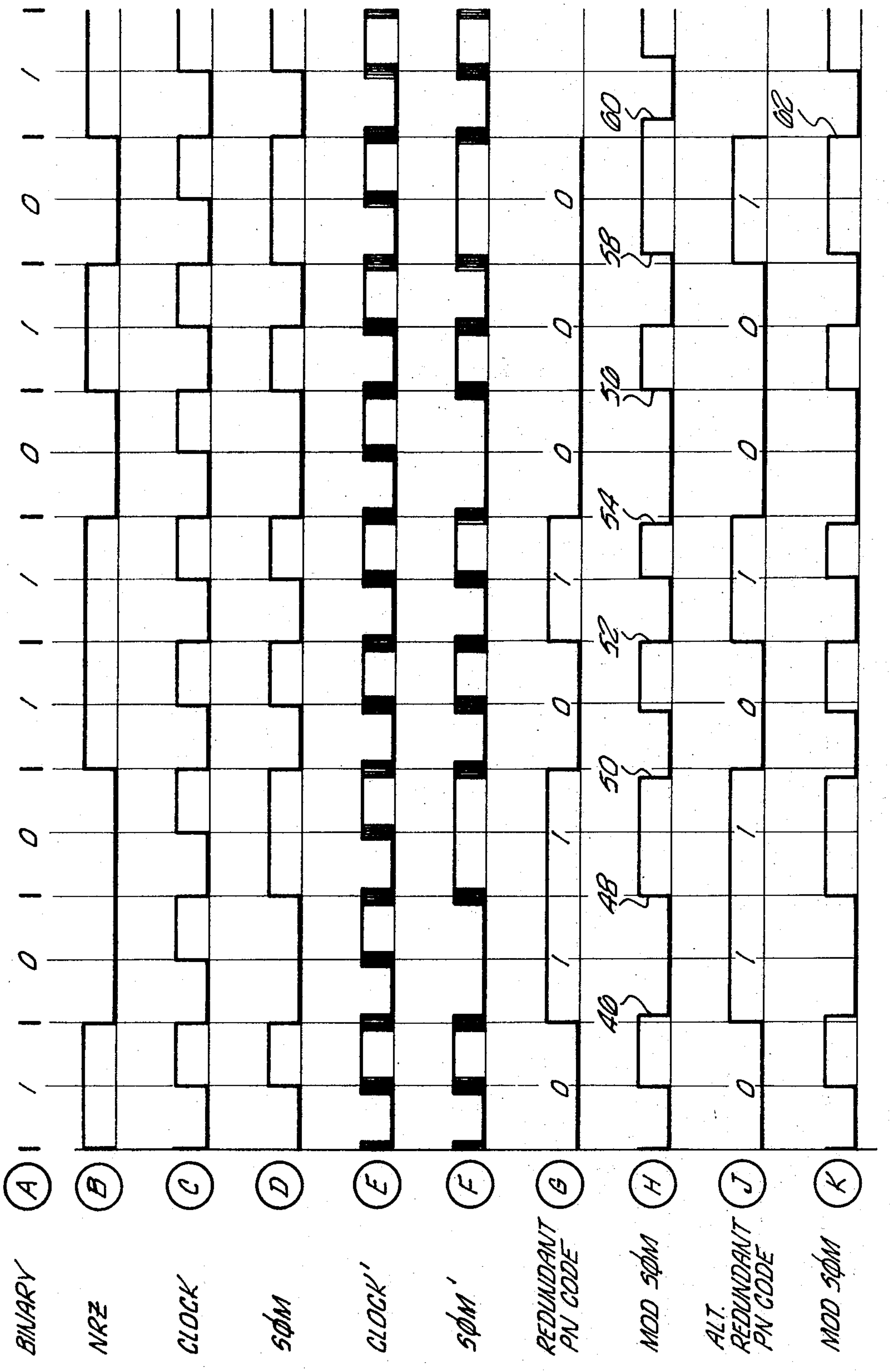

Returning to FIG. 1, let it be tentatively assumed that the output of the pseudo-random generator 26 is applied directly to the phase modulators 20, 22 and 24 for the purpose of advancing or delaying the bit cell boundary transition of successive bits to be recorded in each of the separate channels. A suitable exemplary configuration for each of the phase modulators 20, 22 and 24 is illustrated by FIG. 2. As shown, the up/down counter 30 of conventional design controls the operation of a data selector 32 to have data received from a selected single one of several output taps of a shift register 34. The data selector 32 provides the data at an output terminal 36 which is connected to the recording head 18.

The counter 30 is connected to receive the succession of bits of the pseudo-random sequence at an input terminal 38 such that the contents of the counter 30 is successively increased or decreased in response to, and in accordance with, the binary 1's or 0's of the pseudo-random sequence. The three output terminals shown for the counter 30 simply indicate how the contents of a digital counter may be conventionally applied to the data selector 32 in digital form. As the contents of the counter 30 is increased, or decreased, the selector 32 operates to change the tap of the shift register 34 through which data is to be outputted. In this fashion, the tapped shift register 34 is basically operated as a variable delay line under the control of the selector 32 and the counter 30. If a binary 1 of the pseudo-random sequence is to produce an early transition, an increase in the contents of the counter 30 would control the selector 32 to change to a tap of the shift register 34 providing less delay, i.e., from a tap 40 to a tap 42. A binary 0 of the pseudo-random sequence would produce an opposite result by having a decrease in the counter contents control the selector 32 to change to a tap of the register 34 to produce a longer delay, i.e., change from the tap 40 to a tap 44. The number of taps required for the shift register 34 is dependent on the pseudo-random sequence used such that a run of either binary 1's or 0's will be accommodated. The eleven different taps of the shift register 34 shown in FIG. 2 would be sufficient to accommodate a sixty-three bit pseudo-random sequence.

Assuming that the shift register 34 provides a delay time corresponding to one data bit cell in length, and, the desired temporal variations are to be in increments equal to, for example, one-sixteenth of a bit cell length, the shift register may be operated in response to a clock signal that is sixteen times faster than the system clock signal applied to the counter 30.

Referring again to FIG. 7, assume that a data stream to be recorded on channel 1 (FIG. 1) includes the bit sequence 100110101. It is to be understood, that these bits correspond to only one recording channel and would have been every third bit of a serially formatted data stream. Waveform B illustrates such binary data when having an NRZ format. Assuming that the clock signal of waveform C was used in converting the NRZ data to a S0M format, by application to the S0M encoder 14, the data to be recorded on channel "1" would ideally assume the appearance of waveform D.

As a practical matter, the idealized appearance of the clock signal of waveform C and the S0M data of waveform D may appear as waveforms E and F, respectively, which are symbolically shown to include the effects of jitter. Just as a moderate amount of jitter in conventional systems does not frustrate the accurate detection of the recorded data, any ambiguity in the occurrence of the transistions caused by the intentionally produced transition shifts similarly has been found to not effect the accurate detection of the recorded data. It has also been found that altering the temporal occurrence of these bit cell boundary transitions by the earlier mentioned one-sixteenth of a bit cell length is suitable since such a shift is able to be statistically accurately detected.

Assume now that a 7 bit pseudo-random sequence, as shown by waveform G, is used to alter the time of occurrence of bit cell boundary transitions of the S0M data of waveform D by having, as earlier mentioned, the binary 0's of a pseudo-random sequence produce a delayed or late transition, and the binary 1's produce an advanced or early transition. The S0M data of waveform D would assume the appearance illustrated by waveform H. Specifically, the pseudo-random sequence shown in waveform G would cause the bit transition 46 to be late due to the first 0 code bit. The next data transition 48 would be advanced by one-sixteenth of a bit cell due to the second code bit being a binary 1, and the next occurring transition 50 would also be advanced due to the third code bit also being a binary 1. A complete correlation of each of the seven bits in the pseudo-random sequence illustrated by waveform G, with respect to the modulated data stream shown by waveform H, is provided in Table I hereinbelow.

TABLE I

| Pseudo-Random Sequence | Transition | Modulation |
|---|---|---|
| 0 | 46 | Late |
| 1 | 48 | Early |
| 1 | 50 | Early |
| 0 | 52 | Late |
| 1 | 54 | Early |
| 0 | 56 | Late |
| 0 | 58 | Late |

Since the pseudo-random sequence has a preponderance of binary 0's, continuous repetition of the sequence will produce a cumulative delaying of the data stream. A preponderance of binary 1's would cause cumulative advancing. The transition 60 (waveform H) illustrates a cumulative delaying. Such cumulative delaying, or advancing, tends to thwart the keeping of the data stream in synchronism with the system clock (see waveform C). Where this is undesirable, a pseudo-random sequence and the complement thereof may be alternately used to phase modulate the data stream for recordation. The transition 62 (waveform K) illustrates how complementing every other complete sequence will remove any cumulative advancing or delaying by balancing the total number of binary 1's and 0's after completion of both a pseudo-random sequence and its complement.

Referring once again to FIG. 1, the recording portion 10 of the recording system using the synchronization technique in accordance with the subject invention may include a complementing circuit 63 which serves to have a pseudo-random sequence and its complement alternately applied to the phase modulators 20, 22 and 24 from the pseudo-random generator 26. As shown, the complementing circuit 63 may include a pair of AND gates 64 and 66 which are connected to receive at one of two inputs thereof the pseudo-random sequence from the generator 26. These AND gates 64 and 66 are alternately enabled by being connected to the output terminals of a conventional flip-flop 68 which is alternately set and reset for successive complete cycles of a pseudo-random sequence. As shown, this may be accomplished by having the Q output of the flip-flop 68 connected as one of two inputs of a reset AND gate 70 and the Q output of the flip-flop 68 connected as one of two inputs of a set AND gate 72. Both of the AND gates 70 and 72 are connected to receive an enabling signal once for each pseudo-random sequence from the counter 28. The AND gates 64 and 66 will thus be respectively enabled for the entire duration of alternate sequences provided from the pseudo-random generator 26.

The AND gate 64 is connected to apply the output thereof to an inverter 74 to provide the desired complement of the sequence from the generator 28. The output of the AND gate 66 and the output of the inverter 74 are applied to the respective phase modulators 20, 22 and 24 via an OR gate 76. The AND gate 66 thus applies the pseudo-random sequence from the generator 26 to the phase modulators 20, 22 and 24 for one complete sequence. The AND gate 64 in combination with the inverter 74 provides the complement of the pseudo-random sequence from the generator 26 to the phase modulators 20, 22 and 24.

The recorded data is recovered from a recording medium by the recovery circuit 12. FIG. 1 illustrates the pertinent components of a single channel, i.e., channel one, of the recovery circuit 12. As shown, the playback circuit 78 is connected to receive signals recovered from channel one by a multi-channel read head 80. The playback circuitry 78 may be any conventional type designed to provide a data signal and a derived clock signal. Any conventional playback circuit may be used. An example of a suitable circuit is described in U.S. Pat. No. 3,636,536, issued Jan. 18, 1972.

The derived clock signals may be applied to an early/late generator circuit 82 which serves to reconstruct the pseudo-random sequence and the complement thereof by detecting the bit cell boundary transitions to be either early or late and providing a signal as exemplified by waveforms G or J (FIG. 7) to an auto-correlator 84 via a complementing circuit 86. The auto-correlator 84 operates to provide a pulsed signal once for each complete pseudo-random sequence.

FIG. 6 illustrates a series of pulses 88 that may be provided by the auto-correlator 84. Where a pseudo-random sequence is auto-correlated with the complement thereof, the pulses would be inverted. If for a seven bit pseudo-random sequence, a complete agreement of all bits during auto-correlation is represented by the number 7, a complete disagreement of all seven bits may be represented by the number 0.

The pulses provided by the auto-correlator 84 may be appropriately sensed by a pair of threshold detector circuits 90 and 92, when necessary, which then provide the desired sync pulses via an OR gate 94.

The exact same circuitry shown for the recovery circuit 12 in FIG. 1 would be provided for each of the other channels of the recording system to provide a sync pulse for each of the channels. These sync pulses may then be used to align the de-skew or de-jitter buffers in a conventional manner to compensate for the earlier discussed physical misalignment of the recording medium such as a tape.

Referring to FIG. 3, an exemplary early/late generator circuit 82 is shown to include a transition detector 96 of conventional design which serves to provide a pulse to a counter 98 in response to each boundary transition. Any of the conventional detector arrangements may be used wherein midbit transitions are effectively masked. The counter 98 is connected to be reset or initialized by the application of each pulse from the transition detector 96. The counter 98 is of the type that otherwise will cyclically count to a preselected maximum value whereupon the counter 98 automatically returns to zero and continues to count to the maximum value. The counter 98 is adapted to have a pair of output terminals 100 and 102 which are respectively connected to the set and reset input terminals of a flip-flop 104 to set the flip-flop 104 at the count of 0, and reset the flip-flop 104 at the count of 4. The waveform of FIG. 4 illustrates the output signal provided by the flip-flop 104 which will remain reset until the count reaches 0. As may be recalled, the advancing or delaying of the transitions of the boundary transitions may be one-sixteenth of a bit cell length. Hence, a sixteen bit counter is employed. Where a different fraction is desired to be used for the respective phase shifts for the boundary transitions, an appropriate count may be used. The resetting of the flip-flop 104 at a count of 4 has been arbitrarily chosen and may of course be any other number suitable to detect one-sixteenth of a bit cell phase shifts.

The set output of the flip-flop 104 is connected as an input to both of a pair of AND gates 106 and 108. The input to the AND gate 106 is inverted to have a high input applied to the AND gate 106 between the counts of 4 through 16. A high input is provided to the AND gate 108 getween the counts of 0 through 4. An early transition will ideally occur after fifteen-sixteenths of a bit cell period. Conversely, a late transition will occur after seventeen-sixteenths of a bit cell period. Accordingly, only the AND gate 106 will be enabled when early transitions occur and only the AND gate 108 will be enabled when late transitions occur. As shown, the AND gate 106 may be connected to the set input of a flip-flop 110. The flip-flop 110 will accordingly provide a high output signal at the Q output terminal thereof in response to early transitions. Conversely, the flip-flop 110 will be reset and thereby provide a low output signal at the Q output terminal thereof by being reset by the AND gate 108 in response to late transitions.

The re-created, or recovered, pseudo-random sequence provided by the early/late generator 82 is applied to the complementary circuit 86 to remove the alternating complementary sequences. To this end, the complementary circuit 86 operates in the fashion of the circuit 63 to invert every other sequence applied thereto. The sync pulses provided by the auto-correlator 84 may be used in place of a suitable counter, such as the counter 28 that was used with the circuit 63.

It is noted that if the sequences, rather than the complements thereof, are inverted by the complementary circuit 86, negative-going pulses may be provided by the auto-correlator 84 when it is preset for the sequence as provided by the generator 26.

Referring now to FIG. 5, an auto-correlator circuit 84 may include a shift register circuit, or the like, that is connected to provide an output at the respective taps thereof whenever the signal applied thereto is favorably compared with a prescribed bit. As an example, the shift register may include a series of flip-flops 114*a* through 114*g* which are latched in accordance with a selected pseudo-random sequence to be auto-correlated. The amplitude of the output signal provided at the output terminal 116 via a network of resistors 118 will be at a maximum high level when all bits favorably compare with the latched values. A minimum low level, i.e., zero, will occur when none of the values compares favorably. In either case, the maximum high or minimum low amplitude signal will be uniquely distinctive and will occur once each complete cycle of the pseudo-random sequence.

From the foregoing discussion it is now clear that the subject invention provides a technique in which pseudo-random sequences are used to provide, with improved accuracy, synchronization signals for each of several parallel recording channels of a recording system wherein sync pulses may be used to align the de-skew or de-jitter buffers, etc., that are typically included in a multi-channel recording system.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A synchronization system for providing pulsed synchronization signals at predetermined time intervals, said synchronization system being useful with magnetic recording systems adapted for concurrently recording digital data on multiple parallel channels, said recording system including recording circuitry having means for concurrently applying digital data to a recording transducer for recordation on a multiple channel recording medium, and recovery circuitry having means for recovering data signals recorded on said recording medium, said synchronization system comprising:

generator means for providing a pseudo-random sequence signal including repetitive cycles of a selected succession of binary bits; and modulation means responsive to said pseudo-random sequence for phase modulating digital data signals to be recorded in accordance with said preselected succession of binary bits.

2. The synchronization system defined by claim 1 further including first complementing means for inverting alternate repetitive cycles of said pseudo-random sequence to have said digital data signals alternately phase modulated in accordance with said preselected succession of binary bits of said pseudo-random sequence, and the complement of said preselected succession of binary bits.

3. The synchronization system defined by claim 1 further including:

regenerating means, responsive to recovered recorded signals, for regenerating the preselected succession of binary bits of said pseudo-random sequence signal, or the complement thereof; and auto-correlation means for auto-correlating said regnerated pseudo-random sequence signal to provide pulsed signals uniformly occurring once each cycle of said pseudo-random sequence.

4. The synchronization system defined by claim 3, said regenerating means including:

detector means, connected to receive recovered recorded signals, for detecting the succession of binary bits, alternately forming said pseudo-random sequence and the complement thereof, used to phase modulate the recorded signals; and second complementing means for inverting alternate cycles of the detected succession of bits forming said pseudo-random sequence and the complement thereof.

5. The synchronization system defined by claim 3, further including detector means connected to said auto-correlator means for detecting said pulsed signals for providing desired pulsed synchronization signals.

6. The synchronization system defined by claim 1, said digital data signals to be recorded having a format including bit cells and for which a transition occurs at each bit cell boundary, said modulation means including means for respectively advancing and delaying the occurrence of said bit cell boundary transitions in response to binary ones and binary zeros of said pseudo-random sequence.

7. The synchronization system defined by claim 6, said modulation means including:

a tapped delay line to which data signals to be recorded are applied, said tapped delay line including a plurality of output taps from which said data signals may be outputted from said delay line;

an up/down counter, connected to receive said succession of bits forming said pseudo-random sequence and the complement thereof, for phase modulating said data signals to be recorded, the contents of said counter being respectively incremented or decremented in accordance with said binary ones and binary zeros of said succession of bits; and a data selector, responsive to operation of said up/down counter, for changing the output tap of said delay line from which data signals are outputted.

8. The synchronization system defined by claim 2 further including:

regenerating means, responsive to recovered recorded signals, for regenerating the preselected succession of binary bits of said pseudo-random sequence signal, or the complement thereof; and auto-correlation means for auto-correlating said regenerated pseudo-random sequence signal to provide pulsed signals uniformly occurring once each cycle of said pseudo-random sequence.

9. The synchronization system defined by claim 8, said regenerating means including:

detector means, connected to receive recovered recorded signals, for detecting said succession of binary bits alternately forming said pseudo-random sequence and the complement thereof, used to phase modulate the recorded data signals; and second complementing means for inverting alternate cycles of the detected succession of bits forming said pseudo-random sequence and the complement thereof.

10. The synchronization system defined by claim 9, said first and second complementing means including:

an input connection;

an output connection;

a first selectively enabled conductive path for transmitting signals from said input connection to said output connection;

a second selectively enabled conductive path for transmitting to said output connection an inversion of signals applied to said input connection; and control means for alternately enabling said first and second selectively conductive paths for alternate cycles of said pseudo-random sequence.

11. The synchronization system defined by claim 10, said digital data signals to be recorded having a format including bit cells and for which a transition occurs at each bit cell boundary, said modulation means including means for respectively advancing and delaying the occurrence of said bit cell boundary transitions in response to binary ones and binary zeros of said pseudo-random sequence.

12. The synchronization system defined by claim 11, said modulation means including:

a tapped delay line to which data signals to be recorded are applied, said tapped delay line including a plurality of output taps from which said data signals may be outputted from said delay line;

an up/down counter, connected to receive said succession of bits forming said pseudo-random sequence and the complement thereof, for phase modulating said data signals to be recorded, the contents of said counter being respectively incremented or decremented in accordance with said binary ones and binary zeros of said succession of bits; and a data selector, responsive to operation of said up/down counter, for changing the output tap of said delay line from which data signals are outputted.

* * * * *